(12) United States Patent
Murray et al.

(10) Patent No.: US 11,353,477 B2
(45) Date of Patent: Jun. 7, 2022

(54) APPARATUS AND METHOD FOR MEASURING AIRFLOW THROUGH A SPIRAL CONVEYOR

(71) Applicant: Laitram, L.L.C., Harahan, LA (US)

(72) Inventors: William S. Murray, New Orleans, LA (US); David W. Bogle, Round Rock, TX (US); Juan Borbon, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 86 days.

(21) Appl. No.: 16/961,804

(22) PCT Filed: Dec. 14, 2018

(86) PCT No.: PCT/US2018/065629
§ 371 (c)(1),
(2) Date: Jul. 13, 2020

(87) PCT Pub. No.: WO2019/143426
PCT Pub. Date: Jul. 25, 2019

(65) Prior Publication Data
US 2021/0072275 A1 Mar. 11, 2021

Related U.S. Application Data

(60) Provisional application No. 62/619,235, filed on Jan. 19, 2018.

(51) Int. Cl.
*G01P 5/24* (2006.01)
(52) U.S. Cl.
CPC .................................. *G01P 5/245* (2013.01)

(58) Field of Classification Search
None
See application file for complete search history.

(56) References Cited

U.S. PATENT DOCUMENTS

| | | | |
|---|---|---|---|
| 4,031,756 A | 6/1977 | Rotier et al. | |
| 4,038,870 A | 8/1977 | Rotier | |
| 4,545,244 A | 10/1985 | Yasuda et al. | |

(Continued)

FOREIGN PATENT DOCUMENTS

| | | |
|---|---|---|
| CN | 204007024 U | 12/2014 |
| JP | 09-257818 A | 10/1997 |
| KR | 10-2016-0133084 A | 11/2016 |

OTHER PUBLICATIONS

Huan Z et al: "Airflow blockage and guide technology on energy saving for spiral quick-freezer", International Journal of Refrigeration, Elsevier, Amsterdam, NL, vol. 26, No. 6, Sep. 1, 2003 (Sep. 1, 2003), pp. 644-651, XP004436372, ISSN: 0140-7007, DOI: 10.1016/S0140-7007(03)00044-6.

(Continued)

*Primary Examiner* — Peter J MacChiarolo
*Assistant Examiner* — Jermaine L Jenkins
(74) *Attorney, Agent, or Firm* — James T. Cronvich

(57) ABSTRACT

An omnidirectional anemometer and a method for using such an anemometer to measure the airflow along a conveying path, such as a helical path through a processing chamber. The anemometer is a low-profile, omnidirectional, three-axis anemometer with minimal airflow-occluding structure. Because of its low profile, the anemometer can fit in spiral conveyors with a short tier pitch.

21 Claims, 5 Drawing Sheets

(56) References Cited

U.S. PATENT DOCUMENTS

| | | | |
|---|---|---|---|
| 4,552,016 A | | 11/1985 | Suyama |
| 4,890,488 A | * | 1/1990 | Pincent .................... G01P 5/18 |
| | | | 73/170.13 |
| 5,343,715 A | | 9/1994 | Lang |
| 5,343,744 A | * | 9/1994 | Ammann ................ G01P 5/245 |
| | | | 73/170.11 |
| 5,437,194 A | | 8/1995 | Lynnworth |
| 6,216,544 B1 | * | 4/2001 | Adachi .................. G01F 1/662 |
| | | | 73/861.25 |
| 7,181,981 B2 | * | 2/2007 | Cohen Tenoudji .... G01N 29/02 |
| | | | 73/861.28 |
| 9,612,252 B2 | * | 4/2017 | Waddington .............. G01P 5/24 |
| 10,551,406 B2 | * | 2/2020 | Osborn ................ G01P 13/045 |
| 10,620,231 B2 | * | 4/2020 | Peters ...................... G01P 5/18 |
| 10,976,335 B2 | * | 4/2021 | Zhang ...................... G01P 5/24 |
| 2004/0177693 A1 | | 9/2004 | Tenoudji et al. |
| 2010/0245105 A1 | | 9/2010 | Smith |
| 2014/0021020 A1 | | 1/2014 | Bogle et al. |
| 2016/0324194 A1 | | 11/2016 | Ohrlander |
| 2018/0213801 A1 | | 8/2018 | Morey et al. |

OTHER PUBLICATIONS

Extended European Search Report, European Patent Application No. 18900601.8, dated Aug. 27, 2021, European Patent Office, Munich, Germany, including English Translation of JP H09-257818A.

Ultrasonic Anemometer Model 81000V, instruction manual, R.M. Young Company, Traverse City, Michigan, Oct. 22, 2010.

* cited by examiner

APPARATUS AND METHOD FOR MEASURING AIRFLOW THROUGH A SPIRAL CONVEYOR

BACKGROUND

The invention relates generally to the measurement of airflow and in particular to apparatus and methods for measuring airflow through a spiral conveyor.

In a spiral conveyor a conveyor belt is driven in a helical path around a central drum. Because the helical path includes many tiers, or wraps, around the drum, the belt is long, but is confined to a more compact space than a belt on a linear path of equal length. The compact space and small footprint of spiral conveyors make them popular for use in freezers, cookers, proofers, and other processing chambers. But the compactness of spiral conveyors affects the flow of cooled or heated air through the belt and the products undergoing a particular thermal treatment during their trip along the helical path. And the airflow affects the quality of the thermal treatment of the products. Achieving an optimum airflow by judicious placement, orientation, and speed adjustment of fans results in a uniform or desired thermal treatment of the products.

Anemometers are used to measure airflow. Ultrasonic anemometers, such as the Model 81000V ultrasonic anemometer manufactured and sold by the R. M. Young Company of Traverse City, Mich., U.S.A., use three pairs of ultrasonic transducers to measure airflow in three dimensions from the times of flight of ultrasonic pulses between the transducers in each pair. The transducers are mounted in a structure that shades the airflow in some directions much more than others. For that reason, the anemometer is not uniformly omnidirectional.

SUMMARY

One version of an ultrasonic anemometer embodying features of the invention for measuring airflow comprises at least one pair of opposing ultrasonic transducers supported by a base defining a central open area. The opposing ultrasonic transducers transmit and receive ultrasonic pulses from each other through a common space along multiple transmission paths that intersect at a point in the interior of the common space into which the central open area opens. A first ultrasonic transducer of each pair is disposed at a first distance from the base and a second ultrasonic transducer of each pair is disposed at a second distance less than the first distance from the base.

Another version of an ultrasonic anemometer for measuring airflow comprises a base defining a central open area and three pairs of opposing ultrasonic transducers supported by the base at spaced apart locations. The ultrasonic transducers of each pair transmit and receive ultrasonic pulses from each other through a common space along a transmission path that intersects the transmission paths of the other two pairs at a point in the interior of the common space into which the central open area opens. A first ultrasonic transducer of each pair is mounted to the base at a first distance from the base, and a second ultrasonic transducer of the pair is mounted to the base at a second distance less than the first distance from the base.

A method embodying features of the invention for measuring the airflow through a spiral conveyor in a chamber comprises: (a) placing an airflow measurement device on a conveying surface of a spiral conveyor belt conveying the airflow measurement device along a helical path up or down a spiral conveyor inside a chamber; (b) making periodic airflow measurements with the airflow measurement device as it advances with the spiral conveyor belt along the helical path; and (c) logging or displaying the periodic airflow measurements, or both.

DETAILED DESCRIPTION

Figure 1:
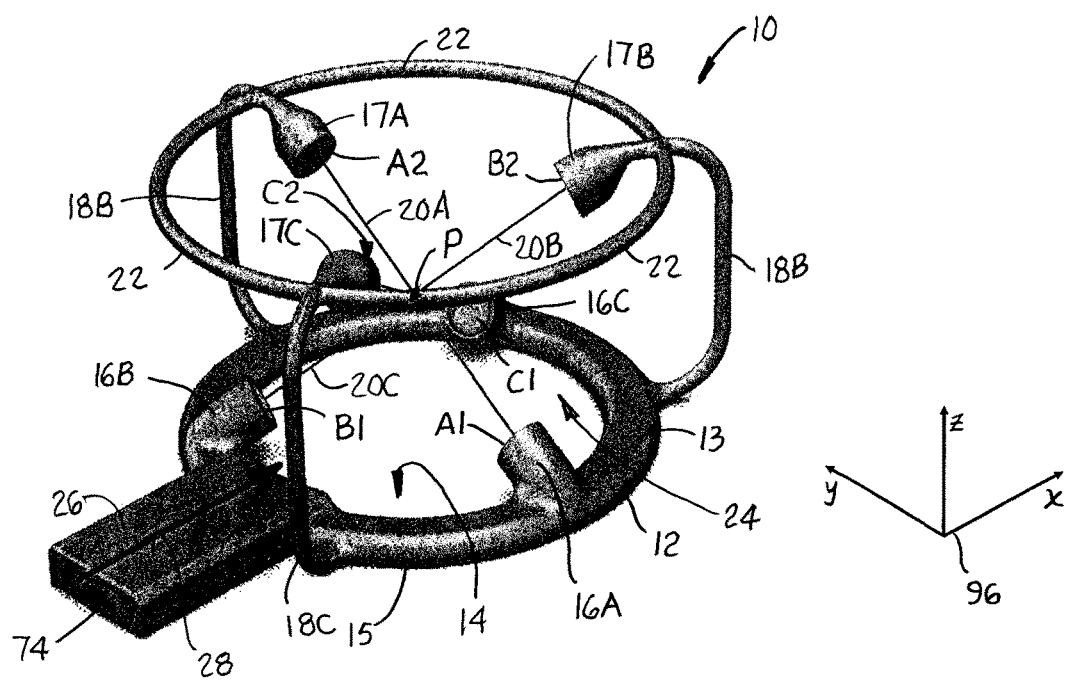
FIG. 1 is an isometric view of a low-profile ultrasonic anemometer embodying features of the invention.

An ultrasonic anemometer embodying features of the invention is shown in FIG. 1. The anemometer 10 has a thin annular base 12 defining a central open area 14. The base 12 has a top 13 and an opposite bottom 15 and forms a narrow band. Instead of being a circular annulus as shown, the base 12 can be elliptical or otherwise curved or can be polygonal. And instead of being an endless band as shown, the base 12 can be segmented. Three base transducer mounts 16A, 16B, 16C extend angularly upward at the top 15 of the base 12. The transducer mounts 16A-C are shown equally spaced every 120° about the base. But they do not have to be equally spaced. An ultrasonic transducer A1, B1, C1 is mounted in a respective mount 16A, 16B, 16C. The transducers A1, B1, C1 are each positioned a first distance from the base 12. In this example all three transducers A1, B1, C1 are the same distance from the base. But they could be located at different distances from the base 12. And the transmit axes of the transducers A1, B1, C1 are all angled upward from the base 12 by the same amount in this example.

Each of the base transducers A1, B1, C1 is paired with a corresponding upper transducer A2, B2, C2. The upper transducers A2, B2, C2 are diametrically opposite and elevated above the base transducers A1, B1, C1 at a distance farther from the base 12 than the lower base transducers. The upper transducers A2, B2, C2 are mounted in upper transducer mounts 17A, 17B, 17C. The transducer mounts are positioned at the distal terminal ends of thin curved arms 18A, 18B, 18C that extend upward from proximal ends at the base 12. In this example the C-shaped arms 18A, 18B, 18C bend outward from the base 12 before bending back inward at their distal ends, but other arm shapes are possible.

Like the base transducers A1, B1, C1, the upper transducers A2, B2, C2 are equally spaced every 120°. The lower and upper transducer mounts 16A-C, 17A-C orient the transducers of each pair to face angularly upward or downward so that their transmit axes coincide and define transmission paths 20A, 20B, 20C for each transducer pair. Each transducer transmits an ultrasonic pulse to and receives an ultrasonic pulse from its paired transducer along its transmission path 20A, 20B, 20C. The three transmission paths 20A-C intersect at a point P in the middle of a common space 24 between the transducers A1-C1, A2-C2. The three transmission paths are mutually orthogonal in FIG. 1 for best omnidirectional results, but could be non-orthogonal. The open area 14 of the base 12 opens into the common space 24. The thin arms 18A-C and the thin and narrow base 12 with its generous open area 14 give the anemometer a more uniform omnidirectionality by minimizing airflow-obstructing structural elements. To stabilize the upper transducer mounts 17A-C, optional stabilizing members 22 may be provided between circumferentially consecutive transducers as shown.

The arms 18A-C are hollow to accommodate wires connected to the upper transducers A2-C2. The hollows in the arms 18A-C open into a channel (not shown) in the bottom 15 of the base 12. The channel forms a cable run for the wires from both the upper and lower transducers A1-C1, A2-C2. The wires are connected to electronic circuitry in an electronics enclosure 26 that extends outward of the base 12. The enclosure 26 houses, among other things, drivers and transmit/receive switches for the transducers. The cable channel can open onto the bottom 15 of the base, or it can be enclosed by the bottom. The electronics enclosure 26 arbitrarily defines an anemometer axis 28 along its radial axis of symmetry intersecting the base 12 that may be used as a reference for orienting the anemometer 10 on a conveyor belt with the axis 28 parallel to the belt's conveying direction, for example. The anemometer axis 28 may also be used to define a 3-D Cartesian coordinate system with an x axis parallel to the anemometer axis 28, a y axis orthogonal to the x axis in a plane parallel to the plane of the base 12, and a vertical z axis perpendicular to the x-y plane.

Figure 2:
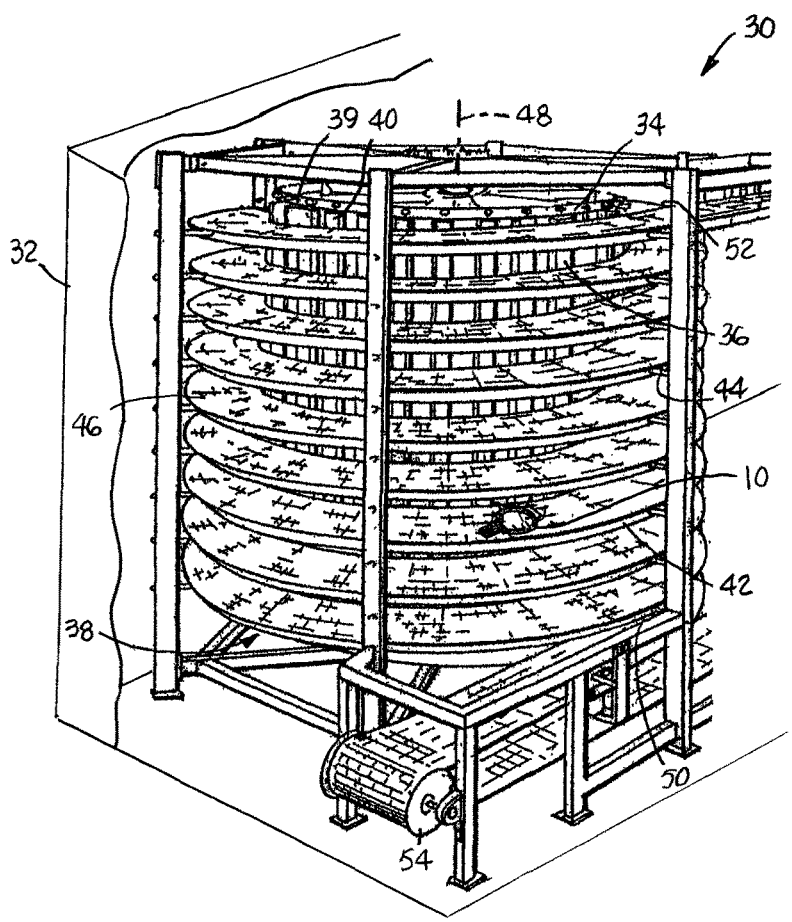
FIG. 2 is a perspective view of an anemometer as in FIG. 1 on a spiral conveyor belt.

FIG. 2 shows a spiral conveyor 30 in a freezer, proofer, cooker, or other chamber 32. The spiral conveyor 30 includes a drive tower 34, or drum, with a cylindrical outer periphery 36 that extends from a bottom 38 to a top 39. Parallel drive members 40 extend in length along the periphery 36 of the drive drum 34 from the bottom 38 to the top 39. The drive members 40 extend radially outward from the periphery 36. A pair of parallel wearstrips 42 (only the outer wearstrip is shown) mounted to a tier support 44 form a helical carryway about the drive drum 34. The helical carryway defines a multi-tiered helical path about the periphery 36 of the drive drum 34 for a sideflexing conveyor belt 46 supported on the wearstrips 42. The drive drum 34 is driven to rotate on a vertical axis 48 parallel to the lengths of the drive members 40 as in FIG. 2. But the drive members could alternatively be arranged in parallel at an angle oblique to the vertical axis 48. The drive members 40 positively engage the inside edge of the conveyor belt 46 to drive it along the helical path. In this example the spiral conveyor 30 is an upgoing spiral for which the belt 46 enters the helical path at an entrance end 50 of the carryway at the bottom 38 and exits at an exit end 52 at the top 39. In a downgoing spiral the entrance end is at the top 39 and the exit end is at the bottom 38. The belt 46 exiting the spiral conveyor 30 passes around takeup sprockets (not shown) and return rollers 54 as it makes its way back to the entrance end 50. The drive drum 34 and the takeup sprockets are conventionally driven by motors (not shown). Other spiral conveyors, such as a low-tension spiral in which the conveyor belt is frictionally driven by an overdriven drive drum rotating faster than the belt speed or a spiral conveyor driven by drive sprockets and not a drive drum would also be usable in the chamber 32 to achieve a small conveyor footprint. The anemometer 10 is shown sitting on the conveyor belt 46 to measure airflow through the spiral conveyor 30 along the helical path. Because the tiers can be close together, the anemometer has to have a low profile. This is especially true for stacker spiral belts, which have short tier pitches. The distance from the bottom 15 of the anemometer's base 12 to the upper transducers A2-C2, i.e., the anemometer's height, can be less than 5 cm for use on short-pitch spirals.

Figure 7A:
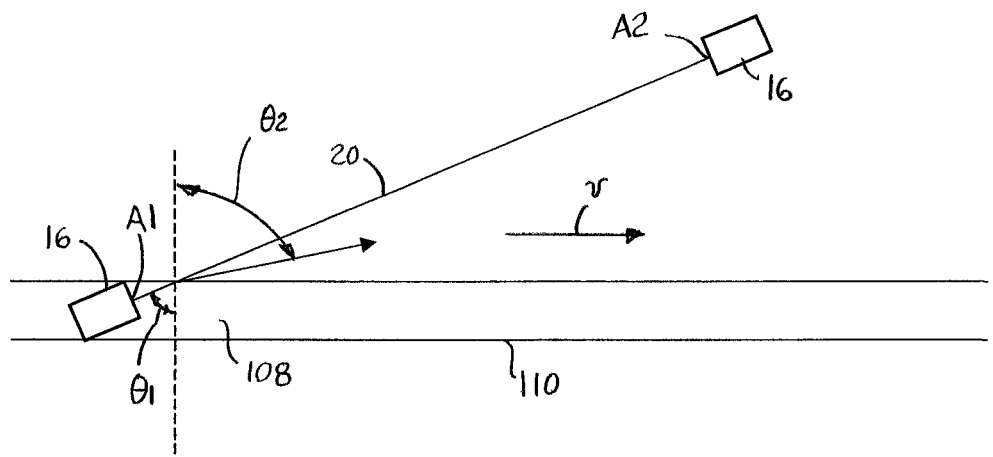
FIGS. 7A and 7B illustrate how refraction of the ultrasonic pulses affects the minimum elevation angle of the pairs of transmitters.
Figure 7B:
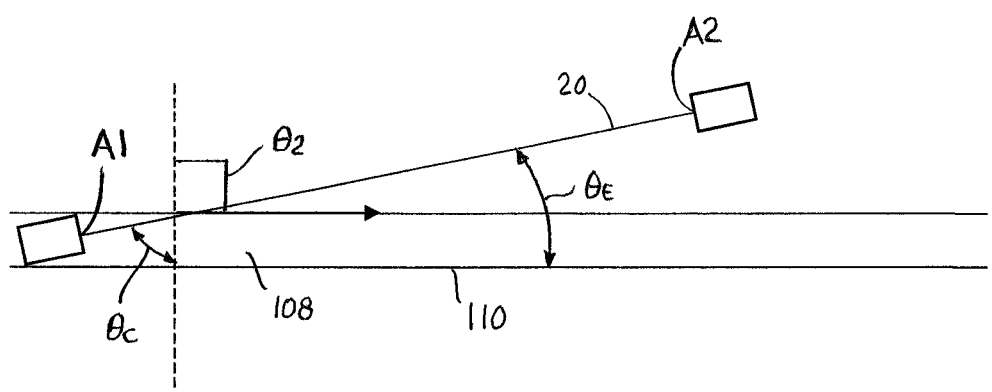

Another factor affecting the design of the ultrasonic anemometer 10 is refraction of the ultrasonic pulses. As shown in FIG. 7A, each transducer mount 16 blocks the airflow in a shaded region 108 close to the lower transducer A1. The acoustic pulse travels at the speed of sound c in air in the shaded region 108. As the pulse exits the shaded region and enters the unshaded airflow along the transmission path 20 at an angle of incidence $\theta_1$, the change in wind speed across the transmission path causes refraction of the ultrasonic pulse at a refraction angle $\theta_2$ and a partial reflection of the pulse at an angle of reflection equal to the angle of incidence. The refraction angle $\theta_2$ increases with wind speed. The angle of incidence $\theta_1$ that results in a refraction angle $\theta_2$ of 90° is the critical angle $\theta_C$, as shown in FIG. 7B. All the ultrasonic pulse's energy is reflected if the angle of incidence $\theta_1$ is less than the critical angle $\theta_C$. The angle of incidence $\theta_1$ is related to the refraction angle $\theta_2$ and the speeds $v_1$ and $v_2$ of the pulse in the two regions by $$\frac{\sin\theta_1}{\sin\theta_2} = \frac{v_1}{v_2}.$$

At the critical angle $\theta_C$, the refraction angle $\theta_2=90°$ and sin $\theta_2=1$. Because the speed of the pulse in the shaded region 108 is given by $v_1=c$ and the speed in the airflow in the unshaded region is given by $v_2=c+v$, where v is the wind speed, sin $\theta_C=c/(c+v)$, or $\theta_C=\sin^{-1}[c/(c+v)]$. If the maximum wind speed, or airflow, to be encountered is $v_{max}$, the critical angle can be calculated as $\theta_C=\sin^{-1}[c/(c+v_{max})]$. For example, if $v_{max}=30$ m/s and c=315 m/s, $\theta_C \approx 66°$. In that case, the elevation angle $\theta_E$ of the transmission path 20 measured from the plane 110 of the base of the anemometer must be 24° or greater to ensure that not all of the ultrasonic pulse is reflected and not transmitted to the receiving transducer A2. So the anemometer must be structured such that the elevation angles $\theta_E$ of the transmission paths are greater than the complement of the critical angle $\theta_C$ for the maximum wind speed $v_{max}$ to be encountered.

Figure 3:
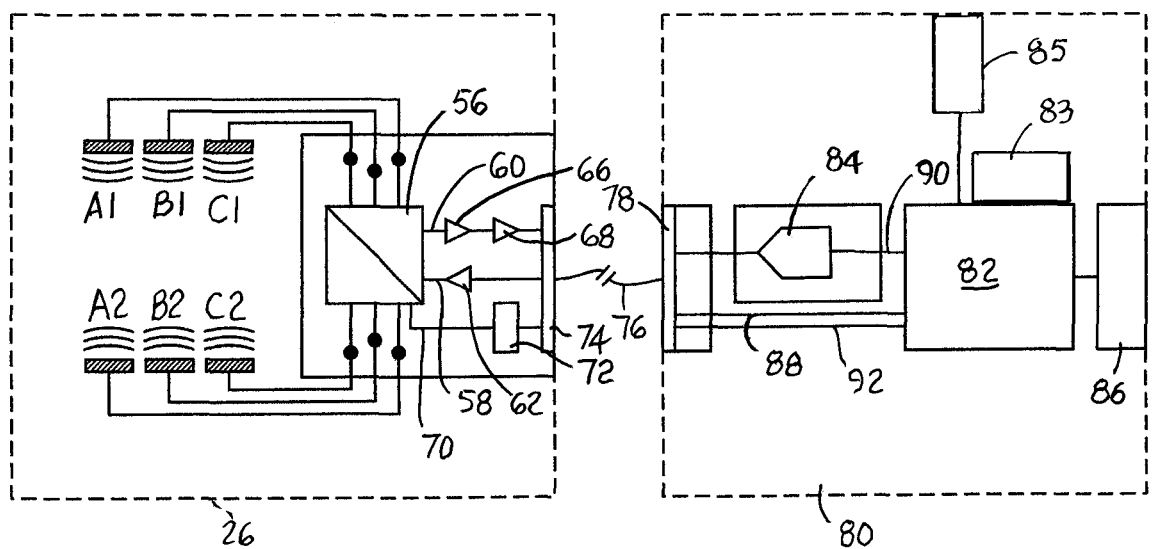
FIG. 3 is a block diagram of the electrical system of the anemometer of FIG. 1.

A block diagram of the ultrasonic anemometer's electrical system is shown in FIG. 3. The three pairs of ultrasonic transducers A1/A2, B1/B2, and C1/C2 are connected to a transmit/receive (T/R) switch 56, such as, for example, a Microchip Model HV2605 high-voltage analog switch, that connects no more than one of the transducers to a transmit channel 58 at a time. The T/R switch 56 also selectively connects one of the transducers to a receive channel 60. A transmit driver 62 in the transmit channel 58 boosts a transmit pulse to an appropriate level for the transducers. The receive channel 60 includes a low-noise pre-amplifier 66 followed by a programmable-gain amplifier 68 to boost the levels of received pulses. The T/R switch 56 and the amplifiers are controlled and powered over control and power lines 70 by power and control circuitry 72. Except for the transducers, the other components can be discrete or can be integrated in a single device for compactness. All the components except the transducers are housed in the enclosure 26 of FIG. 1. A connector 74 on the enclosure mates with one end of a cable 76 whose other end connects to a connector 78 in a processor module 80.

The processor module 80 includes a programmable processor 82, including program and data memory 83, and an analog-to-digital converter (ADC) 84 all powered by a battery 86. The processor module 80, connected to the circuitry in the enclosure 26, rides with the anemometer on the conveyor belt. The processor 82, executing program steps stored in program memory 83, generates transmit pulses on a transmit line 88 that connects via the cable 76 to the input of the transmit driver 62 in the enclosure 26. Pulses received by the transducers and amplified by the amplifiers 66, 68 in the enclosure 26 are routed to the ADC 84 over the cable 76. The ADC 84 converts the received analog pulses into digital values that are sent to the processor over a receive data line 90. The processor 82 controls the operation of the T/R switch 56 over one or more control lines 92 connected by the cable 76 to the control circuitry 72 in the enclosure. Power from the battery 86 is also provided to the power circuitry 72 over the cable 76.

Figure 4:
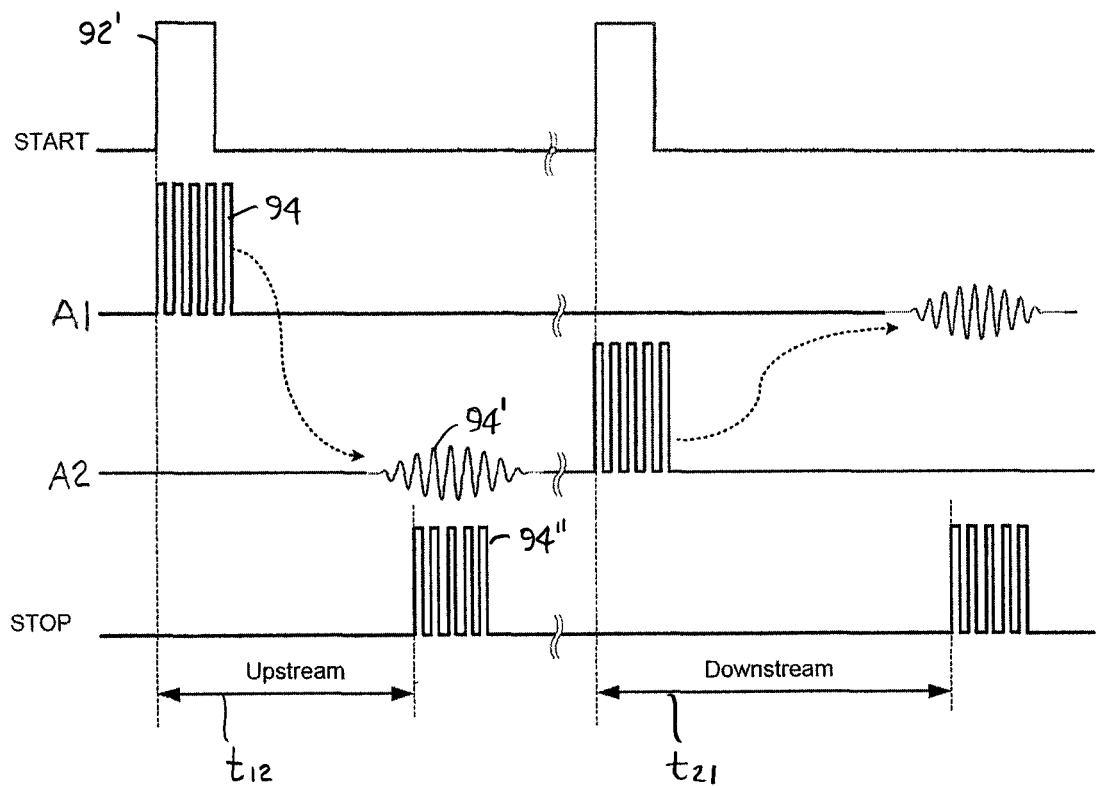
FIG. 4 is a timing diagram illustrating the two-way transmission of ultrasonic pulses by one of the three pairs of transducers.

The operation of the ultrasonic anemometer's two-way transmission is illustrated in FIG. 4 with reference to FIG. 3 for one of the transducer pairs. The processor 82 starts the cycle by sending a command control signal 92' to the T/R switch to connect, in this example, the first lower transducer A1 to the transmit channel 58 and its paired upper transducer A2 to the receive channel 60. At the same time the processor 82 starts a timer and sends a transmit pulse 94 to the transmit driver 62 and the transducer A1. The transmitted ultrasonic pulse is then received by the paired transducer A2 as an attenuated pulse 94'. The processor 82 operates on the digital values converted by the ADC 84 in the receive channel 60 by correlation techniques to detect the amplified received pulse 94" and determine its time of flight $t_{12}$, from the timer. A previously stored waveform template of a received pulse for each transducer is cross-correlated with the received pulse to determine the time of flight, which is logged in data memory 83. Other receiver schemes could alternatively be used. For example, measuring the phase delay at the resonant frequency of a cross-spectral power spectrum transform would give the time of flight. As another example, amplitude thresholding of the received pulses could be used in a direct measurement of the times of flight. After the pulse is received by the transducer A2, the processor 82 starts the reverse-direction pulse transmission from the transducer A2 to the transducer A1 by first commanding the T/R switch 56 to connect the transducer A1 to the receive channel 60 and the transducer A2 to the transmit channel 58. The cycle continues in the same way as for the transmission from A1 to A2 to detect the time of flight $t_{21}$ from the transducer A2 to the transducer A1. The start of the reverse-direction transmission can be a fixed time after receipt of the first pulse, but can be a fixed time after the transmission of the first pulse. The same two-way transmission cycle is then repeated for the other transducer pairs B1/B2 and C1/C2.

The time-of-flight measurement doesn't return the start of the received pulse, but rather the time of the correlation peak. But because the distance between the pair of transducers is known, the theoretical time of flight can be calculated for a given temperature. The time-of-flight measurements are calibrated in a previous calibration run at the given temperature and with no airflow to determine a calibration time of flight. The difference between the theoretical time of flight and the calibration time of flight is a calibration offset that is applied to the operational time-of-flight measurements. The calibration offset for each of the transducers is saved in memory.

The airflow along the transmission path affects the time of flight. FIG. 4 depicts the situation in which the airflow along the transmission path is directed from the lower transducer A1 to the upper transducer A2. In other words the transducer A1 is upstream of the transducer A2. In that situation the time of flight $t_{12}$ from A1 to A2 is less than the time of flight $t_{21}$ from A2 to A1. The difference in the times of flight, $\Delta TOF = t_{21} - t_{12}$, is related to the wind speed v along the transmission path by $\upsilon \approx (\Delta TOF \cdot c^2)/2d$, where c is the speed of sound in air and d is the distance between the pair of transducers A1, A2. The direction of the wind speed $\upsilon$ along a transmission path is given by the sign of $\Delta TOF$.

Once the times of flight $TOF_{A12}$, $TOF_{A21}$, $TOF_{B12}$, $TOF_{B21}$, $TOF_{C12}$, $TOF_{C21}$ for each transmission path (20A, 20B, 20C, in FIG. 1) have been computed by the processor 82, the processor then performs a coordinate-system rotation that converts the components in A-B-C axes defined by the anemometer's three transmission paths into the x-y-z reference frame 96 of FIG. 1 and computes the airflow speeds $\upsilon_x$, $\upsilon_y$, $\upsilon_z$ in the x-y-z reference frame 96. The computation is a matrix computation described by $V = A^{-1} \cdot M$, where $$V = \begin{bmatrix} v_x \\ v_y \\ v_z \end{bmatrix}, A = \begin{bmatrix} \cos\theta_A & \sin\theta_A & \cos\varphi_A \\ \cos\theta_B & \sin\theta_B & \cos\varphi_B \\ \cos\theta_c & \sin\theta_c & \cos\varphi_c \end{bmatrix}, M = \begin{bmatrix} \frac{d_A}{2}\left(\frac{1}{TOF_{A12}} - \frac{1}{TOF_{A21}}\right) \\ \frac{d_B}{2}\left(\frac{1}{TOF_{B12}} - \frac{1}{TOF_{B21}}\right) \\ \frac{d_C}{2}\left(\frac{1}{TOF_{C12}} - \frac{1}{TOF_{C21}}\right) \end{bmatrix},$$

Figure 5:
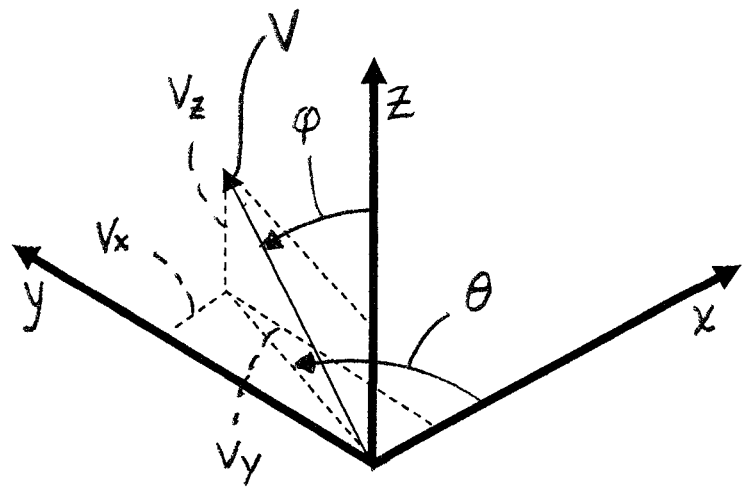
FIG. 5 is a diagram representing an airflow velocity vector in Cartesian and spherical coordinates.

$d_A$ is the distance between the transducers A1 and A2, $d_B$ is the distance between the transducers B1 and B2, dc is the distance between the transducers C1 and C2, $\theta_A$ is the azimuthal angle from the x axis to the transmission path 20A, $\theta_B$ is the azimuthal angle from the x axis to the transmission path 20B, $\theta_C$ is the azimuthal angle from the x axis to the transmission path 20C, $\phi_A$ is the elevation angle from the z axis to the transmission path 20A, $\phi_B$ is the elevation angle from the z axis to the transmission path 20B, and $\phi_C$ is the elevation angle from the z axis to the transmission path 20C, as shown in FIG. 5. Because the helical path of the conveyor is tilted off horizontal, the x-y-z coordinate system is effectively rotated about the y axis if the x axis of the anemometer as defined in FIG. 1 is aligned on the belt in the conveying direction with the y axis aligned radially with respect to the axis of rotation of the drive drum. The airflow velocity components $\upsilon_x$ and $\upsilon_z$ are then adjusted by that tilt angle to refer the x-y-z velocity components to a vertical X-Y-Z reference frame in which the Z axis is a true vertical axis. Once the airflow velocity components $\upsilon_x$, $\upsilon_y$, $\upsilon_z$ are computed and converted to $\upsilon_X$, $\upsilon_Y$, $\upsilon_Z$ components in the X-Y-Z reference frame, the processor 82, with a priori knowledge of the belt speed, transforms the $\upsilon_X$ and $\upsilon_Y$ values from the X and Y axes that are constantly rotating as the conveyor belt advances on the helical path into a stationary reference frame. The three coordinate-system conversions can be done individually one after the other or can be done in a single coordinate-system rotation from the A-B-C frame to the stationary reference frame. The final airflow speed components and the intermediate calculations and times of flight can all be logged in the computer's memory 83 or in a USB drive 85. From the stored data a map of the airflow along the helical path of the spiral conveyor can be produced.

Figure 6:
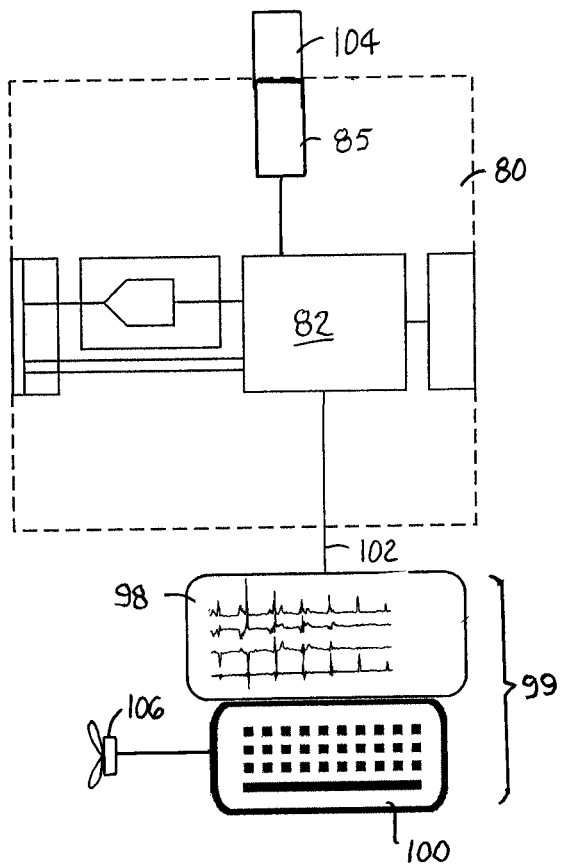
FIG. 6 is a block diagram of a display system usable with an anemometer system as in FIG. 3.
Figure 9A:
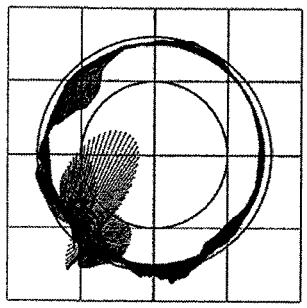
FIG. 9A is an example of an airflow-versus-azimuth display that can be displayed by the display system of FIG. 6.
Figure 9B:
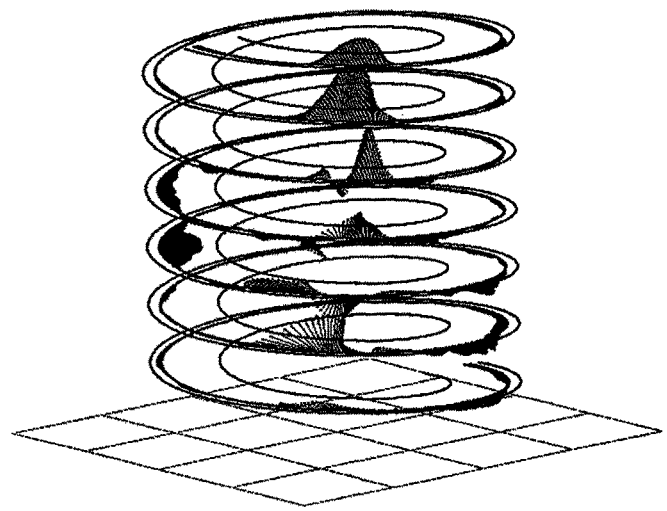
FIG. 9B is an example of a 3D map of airflow versus elevation and azimuth angle that can be displayed by the display system of FIG. 6.

In a typical operation the anemometer 10 is placed on the spiral conveyor belt just after the belt's entry into the spiral. As the anemometer winds its way to the exit, it continuously measures the airflow at a selected rate, for example, eight times per second. Before the anemometer reaches the spiral's exit, it is removed from the belt. Once the anemometer is removed from the belt, the processor module 80 can be connected to an offline display 98 to display the three components and the overall magnitude of the airflow in the chamber 32 (FIG. 2) along the helical path versus time as in FIG. 6 or versus azimuth angle in any horizontal plane or on any tier of the helical path as in FIG. 9A. The azimuthal position of the anemometer at any time can be determined from a knowledge of the belt speed, helical path length, and the elapsed time from a known azimuthal reference position. The azimuthal reference position can be set by a position sensor on or riding with the anemometer that senses a marker at a reference position on the conveyor frame. Visible markers with optical sensors and magnet markers with magnetic sensors are two ways that a reference position can be detected. Another way to get an approximate reference position is with knowledge of the layout of the helical path and the position along the helical path where the maximum airflow is known to be. Then the peaks in the airflow signal versus time or azimuth will correspond to the maximum-airflow position, and the airflow signal between consecutive peaks represents the airflow along the helical path on a tier of the helical path. The airflow can also be displayed as a function of azimuth angle and elevation to produce a 3D map of the airflow, as in FIG. 9B. The display 98, as in FIG. 6, can be coupled in a remote or local computer 99 with a user input device, such as a keyboard 100, for example. The input device 100 can be used to set various operating parameters, such as belt speed, incline angle of the helical path, and measurement cycle rate. The connection 102 between the computer 99 and the processor 82 can be hardwired or can be a wireless communication link. From the display, an operator can determine the airflow pattern along the helical path and arrange and adjust fans 106 and baffles as appropriate to achieve a more uniform or desired airflow through the conveyed products. Or the computer 99 can control the speed of the fan automatically as a function of the airflow measurements. Measurement data and intermediate and final calculated data can also be downloaded from the USB drive 85 to a removable flash memory card 104 for offline analysis.

Figure 8:
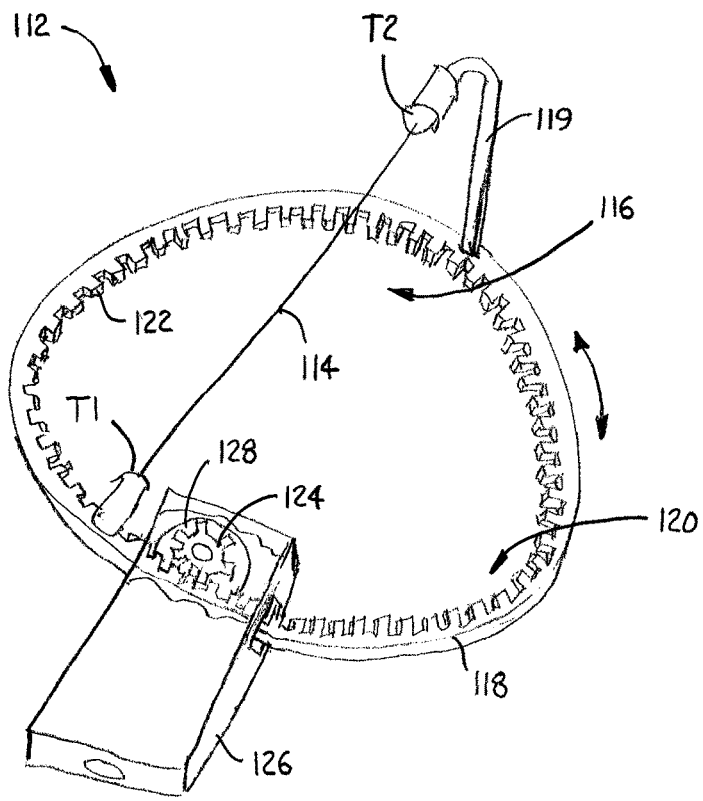
FIG. 8 is an isometric view of another version of an ultrasonic anemometer capable of determining times of flight along multiple transmission paths shown with an enclosure partly opened.

Another version of an ultrasonic anemometer is shown in FIG. 8. Instead of having three stationary pairs of ultrasonic transducers as in FIG. 1, this anemometer 112 has a single pair of opposing transducers T1 and T2 defining a transmission path 114 through a central common space 116. The two transducers T1, T2 are mounted to a base 118 at different distances from the base. The lower transducer T1 is mounted closer to the base 118 than the upper transducer T2, which is mounted at the end of an arm 119 that extends up from the base. The base 118 has a central open area 120 that opens into the anemometer's central space 116. The central open area 120 of the base 118 is bounded by internal gear teeth 122. A pinion gear 124 housed in an enclosure 126 meshes with the base's gear teeth 122 to rotate the base 116. The pinion gear 124 is driven by a bidirectional stepper motor 128 in the enclosure 126. The gear teeth 122, the pinion gear 124, and the motor 128 constitute a moving means for moving the single pair of transducers to measure times of flight along selected transmission paths. In that way a single transducer pair T1, T2 can take measurements of times of flight along multiple transmission paths. And because only a single pair of transducers is used, there is little structural interference with airflow.

Although the invention has been described with respect to a specific version of airflow measurement device; namely, an ultrasonic anemometer, other airflow measurement devices could be used to ride on the belt. Examples include laser Doppler anemometers, constant-temperature anemometers, mechanical anemometers, and pitot tubes.

What is claimed is:

1. An ultrasonic anemometer for measuring airflow, comprising:
    a base defining a central open area;
    at least one pair of opposing ultrasonic transducers disposed in transducer mounts supported by the base, wherein:
        the opposing ultrasonic transducers of the at least one pair transmit and receive ultrasonic pulses from each other through a common space along multiple transmission paths that intersect at a point in the interior of the common space into which the central open area opens;
        the transducer mounts extend into the common space;
        the common space includes an unshaded region unshaded from airflow and the rest of the common space includes shaded regions caused by the transducer mounts' extension into the common space; and
    a first ultrasonic transducer of each of the at least one pairs is disposed at a first distance from the base and a second ultrasonic transducer of each of the at least one pairs is disposed at a second distance less than the first distance from the base.

2. An ultrasonic anemometer as in claim 1 wherein the at least one pair of opposing ultrasonic transducers consists of three stationary pairs of anemometers defining three mutually orthogonal transmission paths.

3. An ultrasonic anemometer as in claim 1 wherein the at least one pair of opposing ultrasonic transducers consists of a single pair of opposing ultrasonic transducers and moving means for moving the single pair to define different ones of the multiple transmission paths.

4. An ultrasonic anemometer as in claim 3 wherein the moving means comprises a motor and a gear coupled to the base to rotate the base and the single pair of ultrasonic transducers.

5. An ultrasonic anemometer as in claim 1 wherein the base defines a plane and wherein an elevation angle of the transmission path of each pair of opposing ultrasonic transducers is greater than the complement of a critical angle for the maximum speed of the airflow to be encountered, wherein the elevation angle of the transmission path is the angle of the transmission path above the plane of the base and the critical angle is the angle of incidence of the transmission path in the shaded region that results in a refraction angle of 90° caused by the change in speed of the airflow across the transmission path from the shaded region to the unshaded region.

6. An ultrasonic anemometer for measuring airflow, comprising:
    a base defining a central open area;
    three pairs of opposing ultrasonic transducers supported by the base at spaced apart locations, wherein:

the ultrasonic transducers of each pair transmit and receive ultrasonic pulses from each other through a common space along a transmission path that intersects the transmission paths of the other two pairs at a point in the interior of the common space into which the central open area opens; and a first ultrasonic transducer of each pair is mounted to the base at a first distance from the base and a second ultrasonic transducer of the pair is mounted to the base at a second distance less than the first distance from the base.

7. An ultrasonic anemometer as in claim 6 wherein the base is annular.

8. An ultrasonic anemometer as in claim 6 wherein the first distance from the base to the first ultrasonic transducers is less than 5 cm.

9. An ultrasonic anemometer as in claim 6 further comprising stabilizing members connected between the first ultrasonic transducers.

10. An ultrasonic anemometer as in claim 6 comprising three arms extending from spaced apart positions on the base to distal ends at which the first ultrasonic transducers are mounted.

11. An ultrasonic anemometer as in claim 6 comprising an enclosure extending from the base and housing electronic circuitry including a transmit/receive switch to selectively connect the first and second ultrasonic transducers pair by pair to transmit or receive pulses.

12. An ultrasonic anemometer as in claim 6 comprising a processor measuring the times of flight of the ultrasonic pulses transmitted in opposite directions along each transmission path and computes the components of airflow velocity along each transmission path from the differences between the times of flight in opposite directions along each transmission path.

13. An ultrasonic anemometer as in claim 12 wherein the processor converts the components of airflow velocity along the transmission paths to components of airflow velocity along a stationary reference frame by a coordinate-system rotation.

14. A method for measuring the airflow through a spiral conveyor in a chamber, the method comprising:

placing an airflow measurement device on a conveying surface of a spiral conveyor belt conveying the airflow measurement device along a helical path up or down a spiral conveyor inside a chamber;

making periodic airflow measurements with the airflow measurement device as it advances with the spiral conveyor belt along the helical path;

logging or displaying the periodic airflow measurements, or both.

15. The method of claim 14 comprising displaying the periodic airflow measurements versus time or azimuth of the anemometer.

16. The method of claim 15 comprising displaying the periodic airflow measurements versus azimuth and elevation of the anemometer along the helical path.

17. The method of claim 14 comprising producing a map of the airflow along the helical path.

18. The method of claim 14 wherein the airflow measurement device is an ultrasonic anemometer.

19. The method of claim 18 wherein the airflow measurement device measures the airflow along three axes.

20. The method of claim 14 comprising removing the airflow measurement device from the spiral conveyor belt when the airflow measurement device is at an exit end of the helical path.

21. The method of claim 14 comprising controlling the airflow by adjusting the speed of a fan as a function of the airflow measurements.

* * * * *